Figure 1:
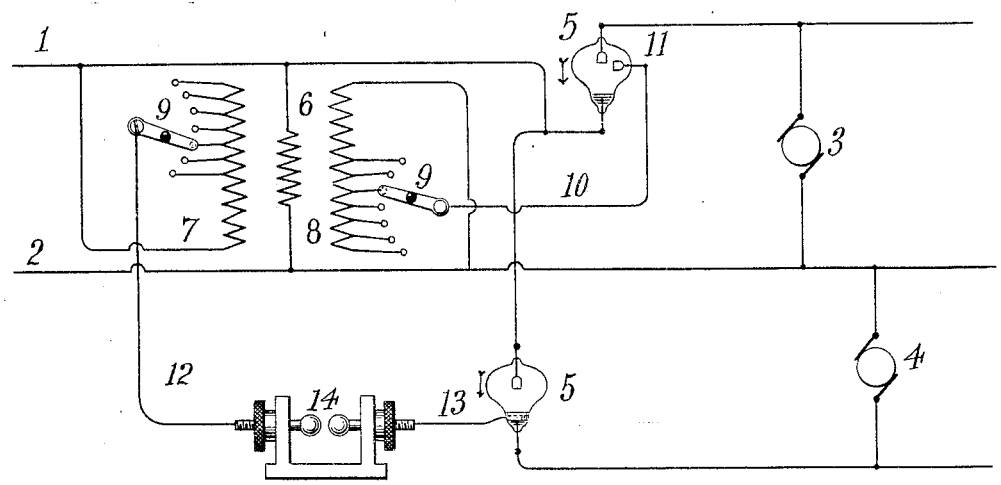

No. 784,016. PATENTED FEB. 28, 1905.
P. H. THOMAS.
SYSTEM OF ELECTRICAL DISTRIBUTION.
APPLICATION FILED MAY 6, 1903.

2 SHEETS—SHEET 1.

Witnesses:
Thos. H. Brown, Jr.
Wm. H. Capel.

Inventor
Percy H. Thomas
by Charles A. Terry Att'y

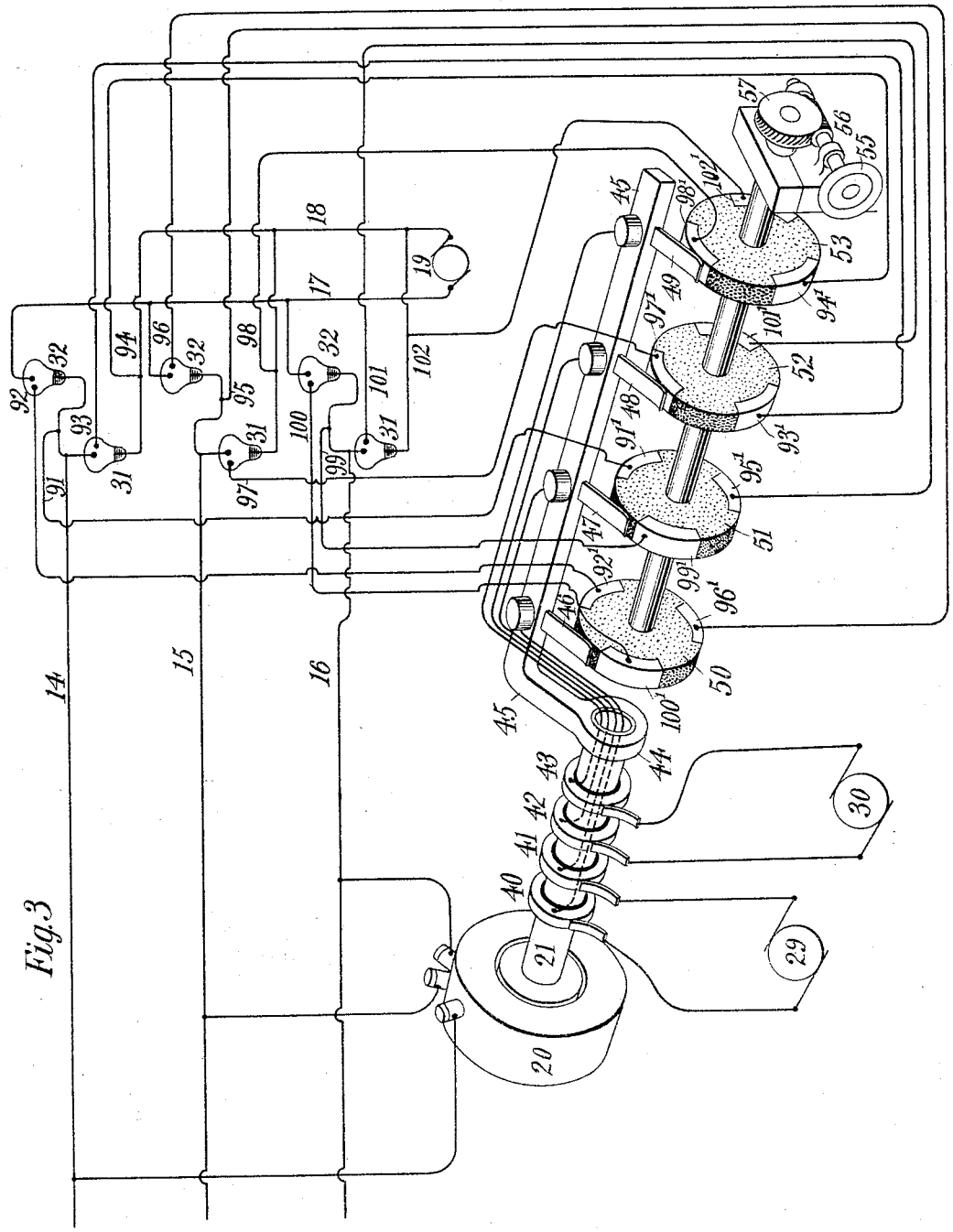

No. 784,016.

Patented February 28, 1905.

UNITED STATES PATENT OFFICE.

PERCY H. THOMAS, OF PITTSBURG, PENNSYLVANIA, ASSIGNOR TO COOPER HEWITT ELECTRIC COMPANY, A CORPORATION OF NEW YORK.

SYSTEM OF ELECTRICAL DISTRIBUTION.

SPECIFICATION forming part of Letters Patent No. 784,016, dated February 28, 1905.

Original application filed February 7, 1903, Serial No. 142,255. Divided and this application filed May 6, 1903. Serial No. 155,926.

*To all whom it may concern:*

Be it known that I, PERCY H. THOMAS, a citizen of the United States, and a resident of Pittsburg, county of Allegheny, State of Pennsylvania, have invented certain new and useful Improvements in Systems of Electrical Distribution, of which the following is a specification.

It is well known that consumption-circuits, such as electric-railway and electric-elevator circuits and others, make varying demands upon the supply-circuit under varying conditions or at different stages of operation. These demands may be normal to the successful operation of the work-circuit, or they may at times be excessive and involve danger to the source of supply or annoying interference with other circuits unless means are provided for preventing such danger and annoyance. Various schemes have been devised for delivering to the receiving-circuit the proper amount of energy from the supply-circuit under varying conditions mentioned; but such schemes have usually involved serious losses and the introduction of cumbersome apparatus, both of which it is desirable to avoid. The method of delivering to the circuits the proper voltage at a given period in the operation by introducing resistance either in the main circuit or in a secondary circuit supplied therefrom is objectionable, by reason of the fact that the total energy is thus cut down and a part of the energy transmitted is consumed by the resistance without productive results. Objections also lie against the use of autotransformers—say for lowering the voltage at the starting of an electric-elevator motor—by reason of the disturbing effect of the current taken by the motor upon the supply-circuit. Other systems for delivering the proper voltage to the receiving-circuit involve the use of complicated apparatus or systems of circuits which, as being designed for the special purpose of regulating the voltage and as being otherwise unnecessary, are needlessly expensive.

The present invention contemplates the delivery of the proper electrical energy to a receiving-circuit by utilizing under different conditions of demands on the part of such circuit different portions of the cycles from the source of supply. By introducing into the circuit between the source and the point or points of utilization devices by means of which the moment of starting can be predetermined it is made possible to select, as indicated, portions of the successive cycles which shall be adapted to give the desired energy. Upon a change of conditions resulting from the described action or from any other cause the amount of energy then supplied to the receiving-circuit can be duly varied by utilizing other portions of successive phases. The receiving-circuit may not always require the delivery of variable electrical energy from the source of supply; but in some instances the translating devices in such a circuit may conveniently be operated from the supply system at constant voltages lower than those which the supply-circuit is capable of delivering, and in such cases the system herein described is adapted to supply such lower constant voltages. In other words, my system of circuits and apparatus may be utilized for delivering the proper electrical energy to constant-potential translating devices, provided the proper portions of the cycles are selected and the application of such portions to the receiving-circuit is continued. Examples of the type of translating device referred to in this paragraph are incandescent electric lamps, electric heaters, electromagnets, or any other devices adapted to be operated on constant potential. The control of the starting-point in any given cycle may be brought about through the action of current-rectifiers, which permit the flow of current in one direction and oppose a practically prohibitive resistance to the flow of current in the opposite direction, coupled with devices in the supply-circuit for so accelerating the energy derived from the source as to predetermine the time when energy shall begin to pass through the rectifier. The time being selected so as to coincide with a certain portion of a cycle, the energy made use of in the receiving-circuit may be of any desired amount within the capacity of the supply-circuit. Should it be desired to deliver to the receiving-circuit, for example, a current of low voltage, the starting can be so timed as to utilize the latter part of a cycle where the voltage is low, while by a proper adjustment of the controlling devices the part of the cycle which is utilized may be shifted so as to apply to the receiving-circuit the maximum voltage, if desired, or any intermediate voltage. The apparatus described as a rectifier is characterized by a reluctance to starting, which appears particularly at one of the electrodes. When current is applied to the apparatus, an electric strain is produced at the said electrode, and by increasing this strain to the breaking-point the apparatus may be started into operation, after which it will continue to operate until the zero point of the wave is reached. The moment of starting an apparatus of this character can be predetermined by selecting the time when the critical or breaking-down strain is applied to the apparatus.

My invention is illustrated in the accompanying drawings, in which—

Figure 2:
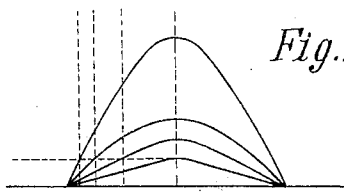
Figure 4:
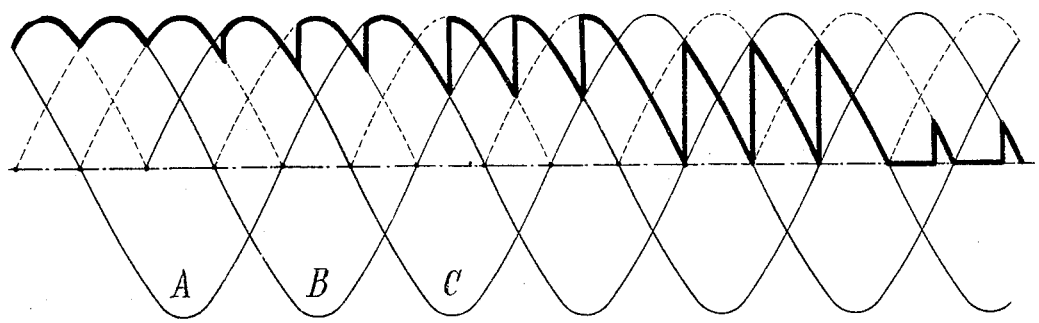

Figure 1 is a diagram of circuits and apparatus adapted to carry out my invention. Fig. 2 is a diagram illustrating a shifting of the starting-point in the cycle due to changes of which the system illustrated in Fig. 1 is susceptible. Fig. 3 is a diagram of a three-phase supply-circuit connected with the mains of a direct-current-consumption circuit in combination with a synchronously-running commutator controlling the delivery of current to the receiving-circuit. Fig. 4 is a diagram illustrating the varying voltages delivered to the receiving-circuit depending on the angular position of the commutator relative to its driving-motor.

Referring to Fig. 1, 1 and 2 represent the mains of a single-phase alternating-current source, and 3 and 4 may represent direct-current motors, such as electric-railway motors, deriving current from the said source. I connect one terminal of each of the motors 3 and 4 with the supply-circuit main 1 through a current-rectifier 5, as shown. These rectifiers are of the general character of the apparatus described above and disclosed in certain patents issued to Peter Cooper Hewitt on the 17th day of September, 1901. Devices of this sort are now known to possess the characteristic of operating under the proper conditions to permit the passage of current in one direction and to practically prevent the passage of current in the opposite direction. The arrows near the rectifiers in Fig. 1 illustrate the direction of current-flow through the rectifiers. From the diagram it is clear that the motors 3 and 4 will receive alternate phases of the current from the mains, the direction of flow being the same in both motors. Between the mains 1 and 2 I introduce a primary 6 of a transformer having two secondaries 7 and 8, with each of which a switch-arm 9 may coöperate in such manner as to introduce more or less of the secondary into the circuit. One of the switch-arms 9 is connected by a wire 10 with a supplemental electrode 11 in one of the current-rectifiers 5, and the other switch-arm 9 is connected by a wire 12 with a supplemental electrode 13 in the other current-rectifier. In either or both of the wires 10 and 12 I may interpose a spark-gap, as illustrated at 14. The switches 9 may be mounted so as to be operated simultaneously, or they may be independent switches, as preferred. By means of the adjustment of which these switches make the apparatus capable the degree of acceleration or retardation of the secondary electromotive forces may be accurately controlled, so as to predetermine the moment when the critical strain is applied to the rectifying devices. Accordingly the starting of these devices, and consequently the delivery of current to the receiving-circuit, may be made at any point in a cycle, whereby the energy delivered to the receiving-circuit will be subject to complete control within the limits of the capacity of the supply system. This follows from the circumstance that the current-rectifiers will not carry current of a given phase beyond the zero point of the wave, after which the apparatus requires to be started again before current will be transmitted. In case the latter part of a cycle is selected as that by means of which current is to be supplied to the receiving-circuit the said circuit will be affected by currents of comparatively low voltage, whereas if the starting-point is chosen at or near the beginning of a cycle the voltage will be comparatively large. Manifestly, therefore, the amount of energy delivered to the receiving-circuit is subject to accurate control, and this without substantial sacrifice or loss owing to the fact that substantially all of the energy supplied is utilized in the receiving-circuit, and when a smaller amount of energy is to be delivered to the receiving-circuit the source is only called upon to deliver the amount required without the necessity of overcoming dead resistances. This is accomplished rather by momentarily changing the character of the supply system, so that the amount of energy desired to be delivered to the work-circuit is that which naturally will be supplied under the conditions of the moment without the interposition of controlling devices, thus rendering the loss of energy a minimum.

Another method of producing the described results is illustrated in Fig. 3. In this figure I show mains 14, 15, and 16, which may lead from any suitable source of three-phase alternating current. These mains are led to a suitable consumption-circuit 17 18, adapted to receive currents of uniform direction and supply direct-current translating devices, such as the motor 19. This motor may be adapted to operate an electric elevator and subject to the varying conditions to which such motors are exposed. In the circuit 14, 15, and 16 I interpose a synchronously-running motor 20. The shaft 21 of the motor 20 carries ring collectors 40, 41, 42, and 43 and a hub 44, to which an arm 45 is secured. The said arm carries brushes 46, 47, 48, and 49, which are adapted to bear upon the peripheries of disks 50, 51, 52, and 53. The disks mentioned are mounted upon a separate shaft 54, independent of the shaft 21 and capable of being made to assume any desired angular position by operating a hand-wheel 55 on a worm-shaft 56, the latter coöperating with a worm-wheel 57 on the end of shaft 54. Any other suitable means for varying the angular position of the disks may be substituted for those described. The respective disks are made of some good insulating material, such as porcelain, and in the periphery of each wheel are secured contact-pieces, which are adapted to coöperate with the brushes 46, 47, 48, and 49. By referring to Fig. 3 it will be seen that the said brushes are respectively connected with the collector-rings 40, 41, 42, and 43, these rings being insulated from the shaft 21 and from each other. The rings 40 and 41 are connected with the leads from the small exciting-generator 29, and the rings 42 and 43 are connected with the leads from a similar generator 30. Accordingly the brushes 46 and 47 may be regarded as the terminals of the circuit of the generator 29, while the brushes 48 and 49 occupy a similar relation to the generator 30. Interposed between the supply-circuit 14, 15, and 16 and the receiving-circuit 17 and 18 are current-rectifiers similar to those already described and capable of being started in such a way that current will flow through them in the direction indicated by the arrows. For convenience I may designate the currents flowing from 16 to 15 by the character A, those flowing from 15 to 14 by the character B, and those flowing from 14 to 16 by the character C. The arrangement of circuits and rectifiers shown in Fig. 3 enables these phases to be thrown successively upon the receiving-circuit, as will be fully explained when the character of the commutator is described in detail. Assuming, however, in advance that the commutator will do its work properly, it will readily be seen that, for example, current may flow from the main conductor 16 through the current-rectifier 31 to the main conductor 18 of the receiving-circuit and may return to the conductor 15 after traversing the said receiving-circuit through one of the current-rectifiers 32. It will be convenient to describe the rectifiers 31 carrying current to the receiving-circuit as positive devices and the rectifiers 32 as negative devices. The course of the impulses from the conductor 15 to 14 and from the conductor 14 to 16 may be traced in like manner, it being observed that the current passes from one of the supply-conductors to the conductor 18 through one of the positive devices 31 and returns to the appropriate main conductor of the supply-circuit through one of the negative devices 32. It now remains to describe the commutator and its action with respect to the various rectifiers mentioned. Before doing this it may be well to recall that the object of the commutator and its associated devices is to insure the starting of the various current-rectifiers at a predetermined moment, whereby the energy delivered to the receiving-circuit is taken from those portions of successive cycles which correspond to the amount of energy desired to be so delivered. The successive and repeated starting of the rectifiers is brought about by the closure of a circuit through each rectifier at the time fixed upon in advance for impressing upon such rectifier the critical strain by means of which the electrode reluctance is broken down. This being understood, it may further be stated that the strain is applied to the uppermost of the negative devices, as shown in Fig. 3, through terminals 91 and 92. The other negative devices in order are provided with similar terminals through which they receive the starting impulse, these terminals being numbered, respectively, 95 and 96, and 99 and 100. The various positive devices are respectively provided with terminals 93 and 94, 97 and 98, and 101 and 102. The contacts which coöperate with the various terminals named are indicated at the commutator by similar numerals, with an added exponent. For example, the numerals 91' and 92' at the commutator are the contact-pieces with which the terminals 91 and 92 of one of the rectifiers are connected. It will be seen that the contact groups upon the two disks most remote from the motor 20 are arranged with relation to each other on a line parallel to the axis, while the contacts upon the nearer disks are stepped or zigzagged with relation to the first-named groups. In practice the disk nearest the wheel 57 might be a conducting-disk, providing a constant connection for one side of the positive devices. Now in order to secure the flow of electrical impulses from 16 to 15, 15 to 14, and 14 to 16, as described above, it is manifestly necessary that, for example, the brushes or contacts connected with the terminals 93 and 94 should receive current through the contact-pieces 93' and 94' at the same time that the terminals 99 and 100 are receiving current through the contact-pieces 99' and 100'. In other words, the brushes 46 and 47 should make contact with the contact-pieces 100' and 99' at the same time that the brushes 48 and 49 engage with the contact-pieces 93' and 94'. This set of connections provides a path for the prevailing phases of the current from the main conductor 14 through the work-circuit back to the main conductor 16. Similar connections, assuming the necessary changes, must be made successively to the terminals of the proper current-rectifiers in order to transmit the proper phases, say between 16 and 15 and 15 and 14. It is evident, therefore, that the apparatus described provides means for securing the delivery to the consumption-circuit of successive phases through the different combinations of leads from the source of currents. The timing of these phases so as to accomplish the results already described in connection with the system illustrated in Figs. 1 and 2 is brought about by so arranging the angular position of the commutator with respect to the revolving brushes as to provide that the critical strain shall be applied to the respective rectifiers at a predetermined moment of time. This can manifestly be arranged without difficulty by causing contact to be made between the revolving brushes and their respective contact-pieces at a predetermined moment. Accordingly, just as before, the means now described are capable of feeding the receiving-circuit with energy from the supply-circuit, such energy being of any desired amount within the capacity of the source of supply.

Fig. 4 is a diagram illustrating the various effects which may be produced in the receiving-circuit by utilizing different portions of the cycle. The three heavy lines at the top of the figures and at the left illustrate the three phases delivered to the work-circuit when the starting-point is selected at the beginning of a cycle. The next three heavy lines toward the right indicate the conditions when a point just beyond the beginning of the cycle is selected as the starting-point. The next three heavy lines to the right indicate the conditions when the starting-point is shifted to the summit of the wave, and the next three heavy lines show the conditions when a point beyond the crest of the wave is selected for starting. Thus it appears that the receiving-circuit may be supplied with currents representing any desired portions of successive cycles, from which it results that without serious loss or waste of any kind the needs of such a circuit may be supplied to suit the varying conditions of service and operation.

This application is a division of my application filed February 7, 1903, Serial No. 142,255.

I claim as my invention—

1. In a system of electrical distribution, a supply-circuit and a receiving-circuit, means for automatically transmitting to the receiving-circuit periodic electric impulses of varying magnitude, one or more current-rectifiers interposed at a point or points in the system, said rectifiers being characterized by a reluctance to starting and means for selecting the portions of the several periods during which portions electrical energy shall be delivered to the receiving-circuit.

2. In a system of electrical distribution, a supply-circuit and a receiving-circuit, means for automatically transmitting to the receiving-circuit electrical energy, such means consisting of one or more current-rectifiers interposed at a suitable point or points in the system, said rectifiers being characterized by a reluctance to starting and means for discontinuing the supply of energy at selected intervals.

3. In a system of electrical distribution, a supply-circuit and a receiving-circuit, one or more current-rectifiers interposed at a suitable point or points in the system, said rectifiers being characterized by a reluctance to starting, means for predetermining the time at which the described reluctance is broken down and energy is delivered to the receiving-circuit, and means for automatically applying the energy thus delivered during a determinate period or periods.

4. In a system of electrical distribution, a supply-circuit and a receiving-circuit, the former delivering current in cycles and the latter requiring to be supplied with varying electrical energy under varying conditions, one or more current-rectifiers interposed at a suitable point or points in the system, said rectifiers being characterized by a reluctance to starting and means for withdrawing from the supply-circuit such portion or portions of the existing cycle or cycles as are adapted to deliver the proper energy to the receiving-circuit.

Signed at New York, in the county of New York and State of New York, this 28th day of April, A. D. 1903.

PERCY H. THOMAS.

Witnesses:
    Wm. H. Capel,
    George H. Stockbridge.